United States Patent [19]

Walsh et al.

[11] Patent Number: 5,278,916
[45] Date of Patent: Jan. 11, 1994

[54] FINGERPRINT IMAGE APPARATUS

[75] Inventors: George R. Walsh, North Andover; John D. Plumadore, Westfield, both of Mass.

[73] Assignee: Crimcon, Inc., Westfield, Mass.

[21] Appl. No.: 782,349

[22] Filed: Oct. 24, 1991

[51] Int. Cl.$^5$ .............. G06K 9/42; G06K 9/22; G06K 9/20; H04N 3/06
[52] U.S. Cl. ............................. 382/4; 382/47; 382/59; 382/65; 358/205; 358/408; 358/473; 358/497
[58] Field of Search ............... 382/4, 59-69, 58, 47; 356/71, 73, 390, 397; 359/203, 222, 225, 353; 358/302, 909, 408, 497, 473, 205; H04N 1/21, 1/23, 5/225, 3/06, 1/024, 1/393

[56] References Cited

U.S. PATENT DOCUMENTS

| | | | |
|---|---|---|---|
| 3,584,958 | 6/1971 | Miller et al. | 356/71 |
| 4,588,254 | 5/1986 | Menke et al. | 359/203 |
| 4,792,226 | 12/1988 | Fishbine et al. | 356/71 |
| 4,794,260 | 12/1988 | Asano et al. | 382/4 |
| 4,947,261 | 8/1990 | Ishikawa et al. | 382/59 |
| 4,962,430 | 10/1990 | Hiroki et al. | 358/296 |
| 5,054,090 | 10/1991 | Knight et al. | 382/4 |

Primary Examiner—David K. Moore
Assistant Examiner—Michael R. Cammarata
Attorney, Agent, or Firm—Lahive & Cockfield

[57] ABSTRACT

A fingerprint image system includes a television camera in a cabinet pivotable between two positions where it views different surfaces on which an image can be placed. In one position it sends a fingerprint image at five times magnification to a printer and a monitor. In the other position it sends the image at actual size to the printer and monitor. A remote, hand-held camera, adapted to view fingerprints directly on surfaces, includes a light shield to prevent ambient light from falling on the fingerprint and light sources, such as a filtered light to cause the fingerprint to fluoresce or colored light to enhance the image.

14 Claims, 4 Drawing Sheets

FINGERPRINT IMAGE APPARATUS

This invention relates to apparatus for creating fingerprint images and more particularly to such apparatus that includes television cameras and printers.

Fingerprints are a traditional element in criminal investigations. It is common for those investigating the scene of a crime to dust appropriate areas for fingerprints. Any fingerprints that are successfully detected may be compared to the fingerprints of people authorized to be at the scene or to determine who was at the scene. It is now possible to not only compare these to the fingerprints of authorized personnel or particular suspects but to compare them to those in a huge database of fingerprints.

For example, one such system that is called the AFIS (Automated Fingerprint Identification System) system can take a fingerprint image five times its normal size and compare it automatically to other recorded fingerprints in the database and at least extract fingerprints with great similarities. A visual comparison by a trained observer can then determine whether any of the fingerprints of the database correspond to the one being considered.

To be able to use the AFIS system one has to provide the operators of that system with a large, clear and clean fingerprint image. Often an image lifted from a crime scene is incomplete, fragmentary, faint, or dirty. That fingerprint image needs to be cleaned up and enhanced before it can be used. The cleaning up and enhancing is done by an officer at the originating location who can, for example, make a tracing of the fingerprint and enhance it by strengthening lines, combining partial prints, eliminating dirt marks, etc.

The assignee of this application has previously provided a system for creating a fingerprint image that can be used in the AFIS system. That system has a television camera mounted in an apparatus directed at a surface on which a fingerprint image can be placed. The output from the camera is directed to the printer at five times the magnification of the image, and is also directed into a television monitor. The television monitor allows the operator to see the image the way it will be printed and to orient it appropriately. It is an object of this invention to further enhance the convenience and usefulness of that fingerprint imaging system, particularly for use in the AFIS system.

SUMMARY OF THE INVENTION

The invention provides an apparatus for viewing and printing fingerprint images, comprising a television camera means pivotable between a first and second position, including means for generating image signals representative of an image in the view of the camera, printing means responsive to said image signals for generating a print of said image, and means defining first and second locations where images may be located for viewing by said television camera in the first and second positions, respectively.

Preferably, the image signals provide magnification of an image when the television camera is in its first position and the image is in the first location, and the image signals provide an actual size image when the television camera is in the second position and the image is in the second location. The magnification may be five times for use in the automatic fingerprint identification system (AFIS). The apparatus may further include means for manipulating the image signals when the television camera is in its first position, the printing means responding to the manipulating means to produce gray scale images, negative images, mirror images and binary images. The apparatus could further include signal transmitting means for converting the image signals to signals transmittable to computers. Finally, the apparatus can include a television monitor arranged to receive the image signals and display an image in response thereto.

In a preferred embodiment, the apparatus further includes a hand-held television camera, adapted to view fingerprints on a remote surface and transmit image signals representative of a fingerprint to the television monitor or the printer, the camera including a light shield for preventing ambient light from reaching the fingerprint. The camera, preferably, also includes illumination for the fingerprint, which can be colored light to enhance the fingerprint image or filtered light to cause the fingerprint to fluoresce.

DESCRIPTION OF THE DRAWINGS

Other objects, features and advantages of the invention will be apparent from a description of a preferred embodiment including the drawings thereof, in which.

BRIEF DESCRIPTION OF A PREFERRED EMBODIMENT

Figure 1:
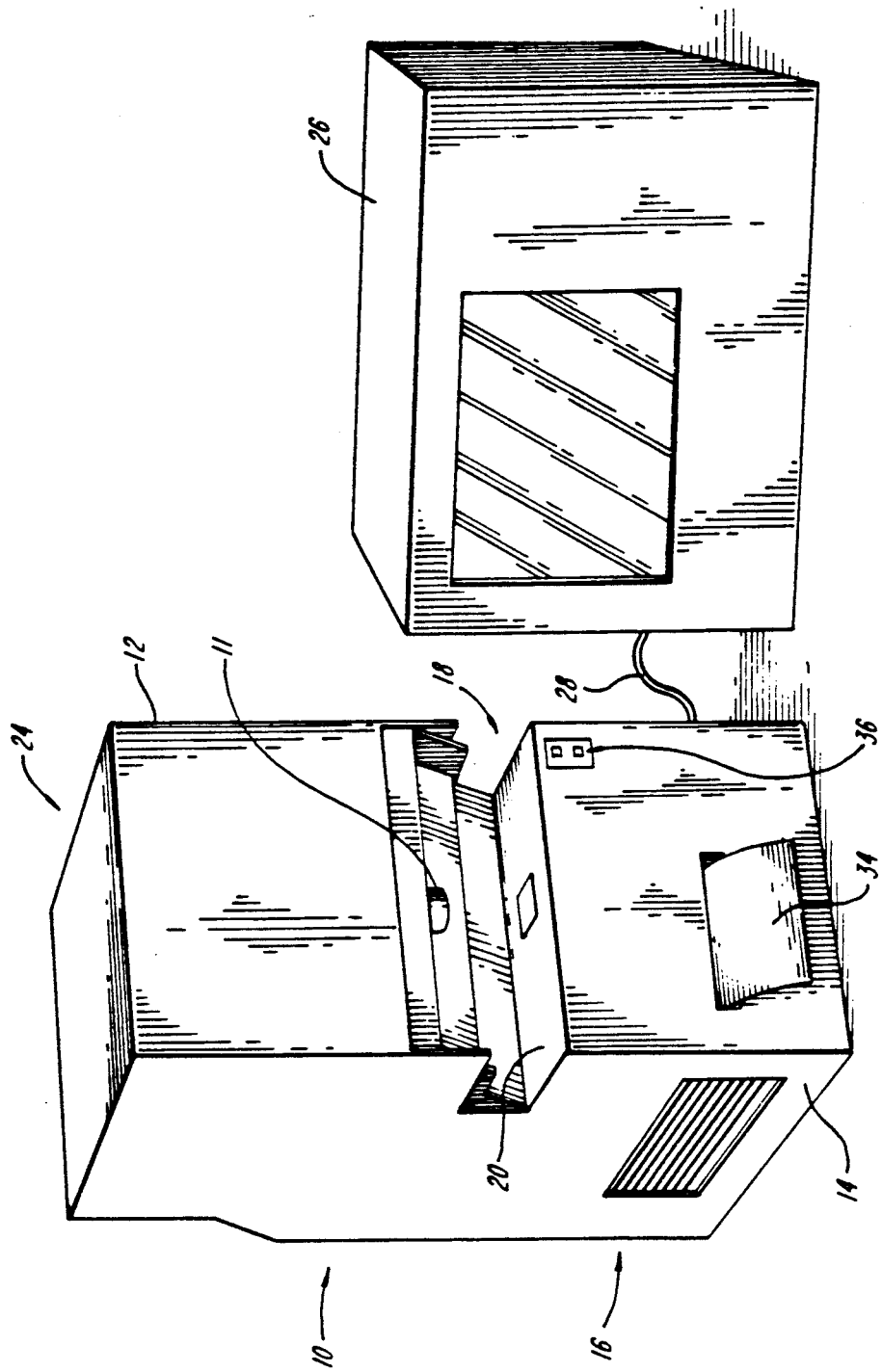
FIG. 1 is a perspective view of an apparatus embodying the invention.

As seen in FIG. 1 the apparatus includes a cabinet 10 which incorporates in it a television camera 11 in the upper portion 12 and a thermal printer 14 in the lower portion 16. At the midpoint of the cabinet there is a cutout portion 18 that provides a first surface 20 at which the television camera 11, in a first position, is directed.

A second surface 22 for presenting an image to the television camera 11, at a second position, is located at the top 24 of the cabinet 10.

A television monitor 26 is also shown in FIG. 1. The television monitor 26 is connected by cable 28 to the output of the television camera 11 in the cabinet 10. The cable 28 transmits image signals representative of an image in view of the camera 11 to the monitor 26 in the conventional manner.

Figure 2:
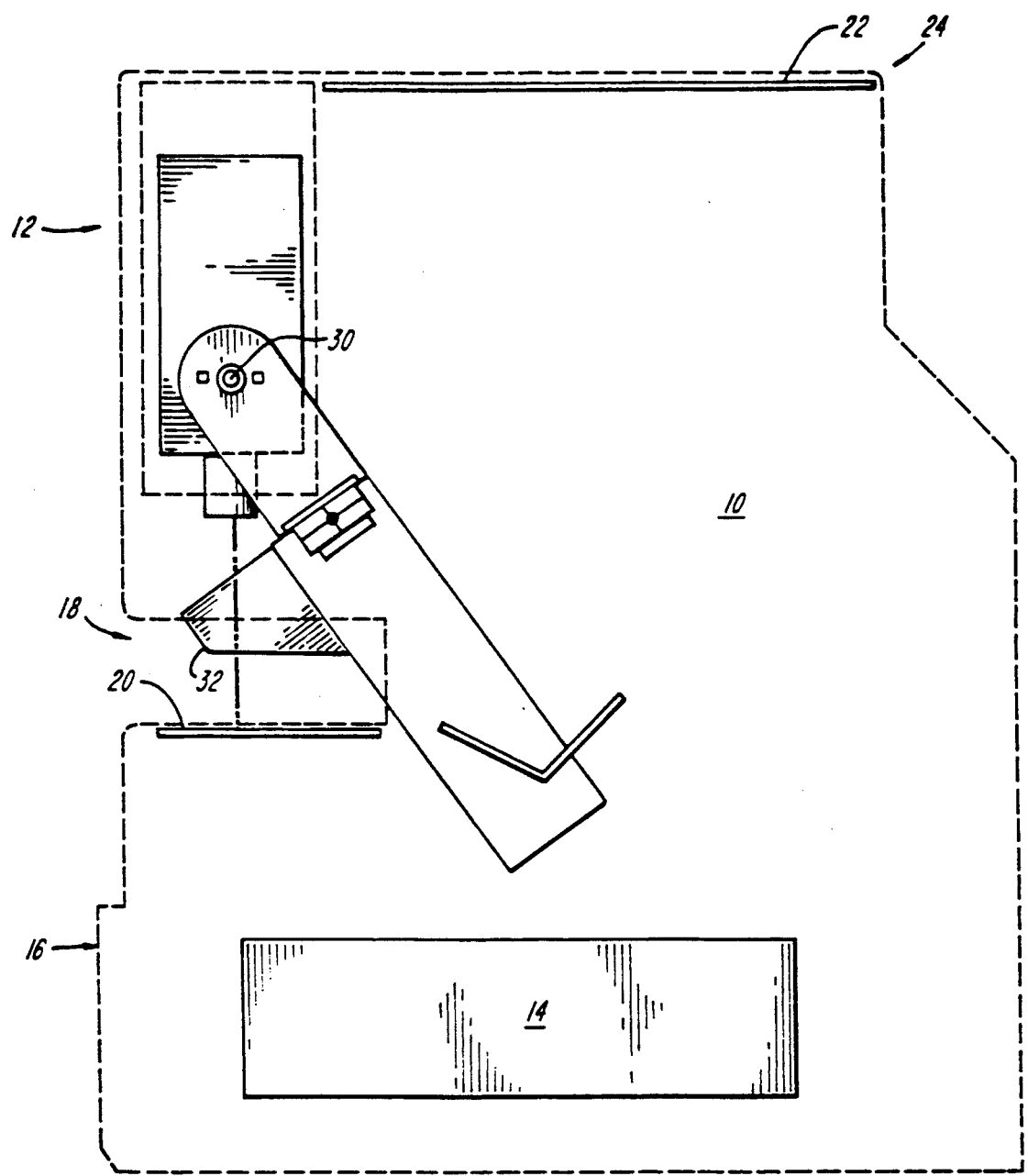
FIG. 2 is a diagrammatic side view of the cabinet including the camera and printer showing the camera in its first position.

Referring to FIG. 2, which is a diagrammatic side view of the cabinet 10, a more detailed view of the apparatus is shown. The television camera 11, which can be, for example, a Panasonic BL200 TV camera available from Panasonic Communications and Systems Company, One Panasonic Way, Secaucus, N.J., is mounted for pivotable motion around a pin 30. In a first position, it is pointed downwardly at a first surface 20 in a mid-location in the cabinet 10. The surface 20 is illuminated by a light 32 mounted in the cabinet 10. The television camera 11 has conventional image transmitting means for transmitting an image of what appears on the surface 20 of the first location to the thermal printer 14 located in the lower portion 16 of the cabinet 10. The thermal printer 14 may be, for example, a Matsushiba P65U thermal printer available from Mitsubishi Electronics America, Inc., 800 Cottontail Lane, Somerset, N.J.

The printer 14 includes conventional means for producing a print 34 of the image at the first surface 20 in response to the signals from the television camera 11. In order to use the produced image in the AFIS system, the television camera 11 is arranged to produce a print 34 shown in FIG. 1 with an image five times that of the image located at the first surface 20.

Furthermore, the output signals from the television camera 11 can be manipulated by circuitry provided in the thermal printer 14 so that the print 34 produced by the printer 14 can be a gray scale image, a negative image, a mirror image or a binary image. Using appropriate circuitry provided by the printer 14, switches 36 to select these various images may be mounted on the surface on the cabinet 10 for manipulation by an operator.

Figure 3:
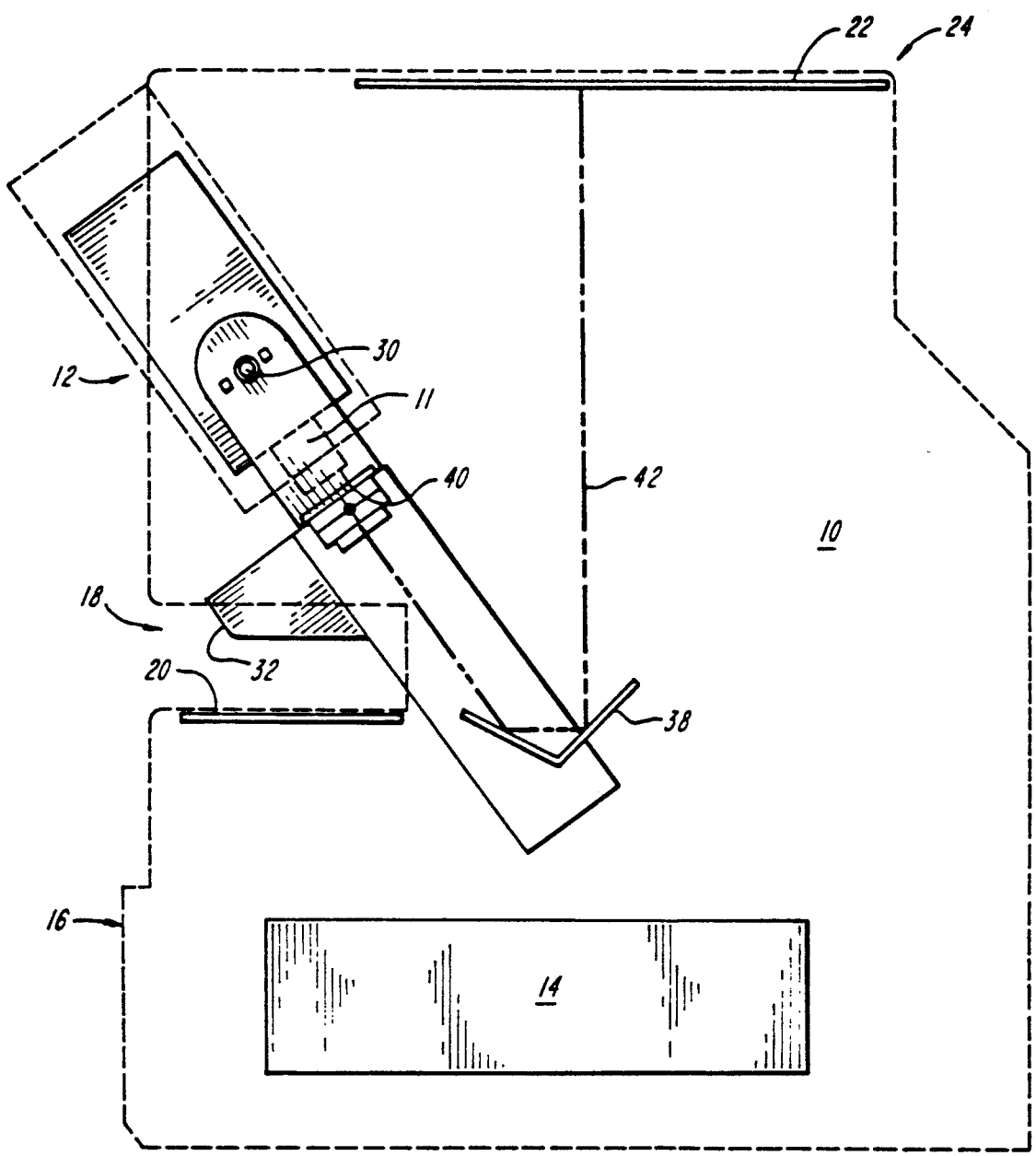
FIG. 3 is a view like FIG. 2 but showing the camera in its second position.

The camera 11 is pivotable by hand to a second position (see FIG. 3) where it captures a view of an image at an upper, second surface 22 on the cabinet 10. By use of a system of mirrors 38 the image at the upper surface is transmitted to the lens 40 of the camera 11 by a path indicated by a dashed line 42. The camera 11 and printer 14 in the cabinet 10 are arranged so that an actual size image or reproduction is provided by the printer 14. Thus, a five times magnification of a fingerprint image can be obtained at the first location, but the image (or anything else) can be placed at the second location for inexpensive full-size copies.

Figure 4:
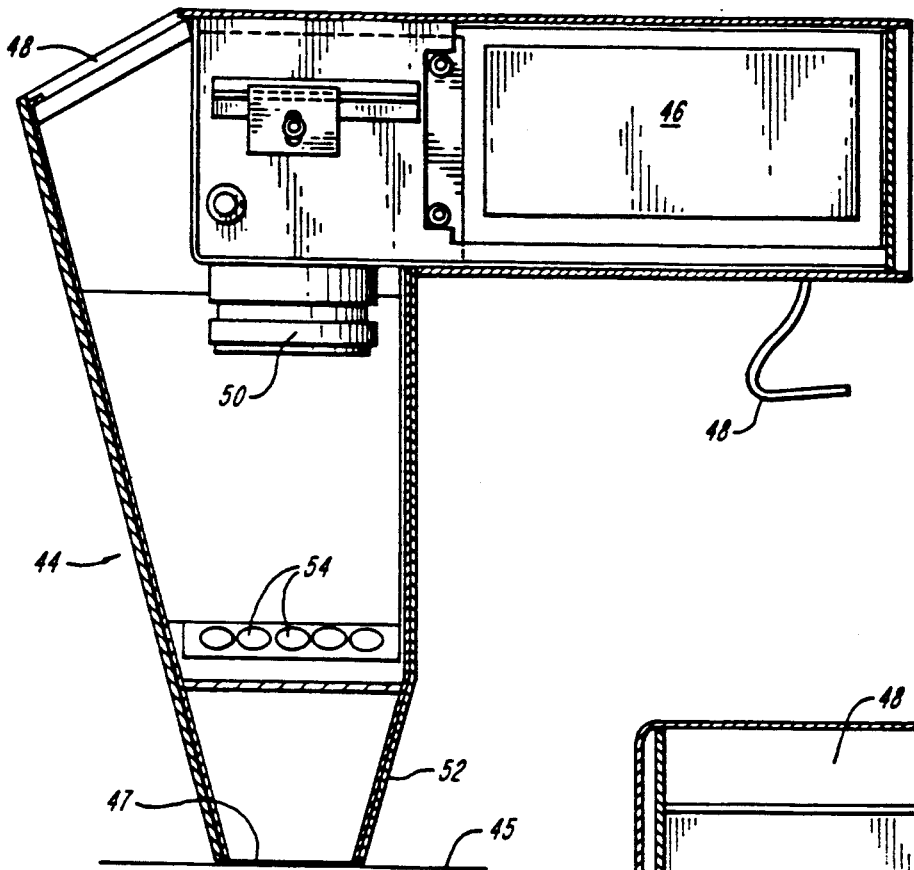
FIG. 4 is a side view of a remote hand-held camera.
Figure 5:
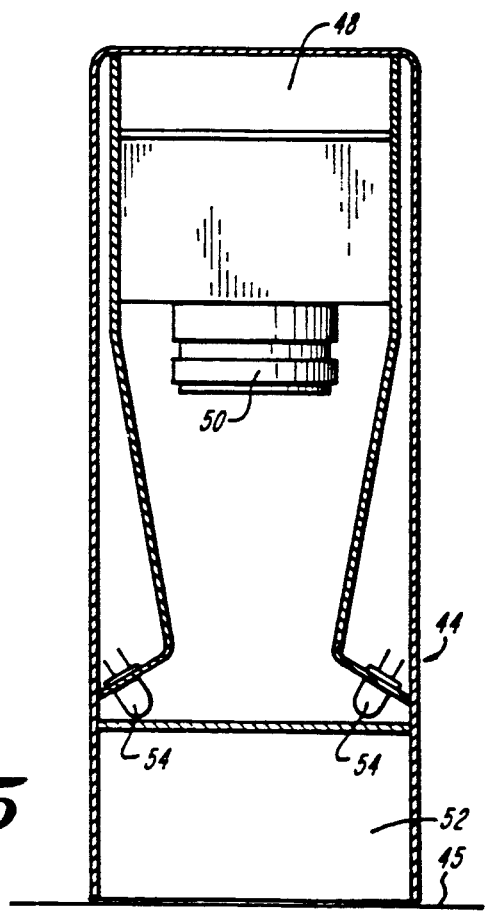
FIG. 5 is an end view of the remote camera of FIG. 4.

Furthermore, a remote, portable, hand-held television camera 44 as shown in FIGS. 4 and 5 can be used to provide an image to be sent to the monitor 26 and the printer 14. This camera 44 can be used when it may be difficult or impossible to "lift" a fingerprint from a surface 45. The remote camera 44 can be placed over the fingerprint 47 on the surface 45 where it appears and an image transmitted to the monitor 26 or printer 14 for viewing or printing of the image. As seen in FIGS. 4 and 5, the camera 44 has a pistol grip 46 and a cable 48 for transmitting image signals representative of a fingerprint being viewed, in the conventional way, to the monitor 26 and printer 14. The remote camera 44 is equipped with its own power supply and light source. It includes a viewing port 48 for monitoring the appearance of the image being transmitted to the lens 50. It includes front light shield 52 for positioning the camera lens 50 the correct distance from the surface and for preventing most ambient light from reaching the fingerprint being viewed. The camera can include appropriate lighting such as green light emitting diodes 54 to produce high contrast images from fingerprints developed by powders or chemicals for which a green light will especially heighten the contrast. Other kinds of light sources, such as a dichroic filtered light, may also be included. A filtered light source 56 may also be mounted for transmission through the view port 48 to cause the fingerprint to fluoresce for better viewing.

The preferred embodiment described above is only illustrative of the invention. Variations and modifications of the embodiment will occur to those skilled in the art and are intended to fall within the scope of the invention, which is set out in the following claims.

What is claimed is:

1. Apparatus for viewing and printing fingerprint images comprising:
   television camera means, including means for generating image signals representative of an image source in view of said television camera means,
   said entire television camera means being pivotable between a first and a second position,
   printing means, responsive to said image signals, for generating a print of said image,
   means defining first and second locations where sources of images may be located for viewing by said television camera means in said first and second positions respectively, and
   said image signals providing a magnification of an image when said television camera is in said first position and said image is in said first location, and said image signals providing an actual size image when said television camera is in said second position and said image is in said second location.

2. The apparatus of claim 1 wherein said magnification is 5 times, for use in an automatic fingerprint identification system.

3. The apparatus of claim 1 further including means for manipulating said image signals when said television camera is in said first position,
   said printing means responding to said manipulating means to produce gray scale images, negative images, mirror images and binary images.

4. The apparatus of claim 1 further including signal transmitting means for converting said image signals to signals transmittable to computers.

5. The apparatus of claim 1 further including a television monitor arranged to receive said image signals and display an image in response thereto.

6. The apparatus of claim 5 further including a remote hand-held television camera means,
   means for adapting said remote camera means to view fingerprints on a remote surface and transmit image signals representative of a fingerprint,
   and means for transmitting said image signals to said television monitor.

7. The apparatus of claim 1 further including a remote, hand-held television camera means,
   means for adapting said remote camera means to view fingerprints on a remote surface and transmit image signals representative of a fingerprint,
   and means for transmitting said image signals to said printing means.

8. The apparatus of claim 7 wherein said adapting means includes a filtered light source means for causing said fingerprints to fluoresce.

9. The apparatus of claim 7 wherein said adapting means includes a filtered light source means for causing said fingerprints to fluoresce.

10. The apparatus of claim 8 wherein said adapting means includes a light shield means for inhibiting ambient light from reaching said fingerprint, and means for illumination of said fingerprint.

11. The apparatus of claim 9 wherein said adapting means includes a light shield means for inhibiting ambient light from reaching said fingerprint, and means for illumination of said fingerprint.

12. The apparatus of claim 6 wherein said adapting means includes colored light emitting sources to enhance illumination of said fingerprint.

13. The apparatus of claim 7 wherein said adapting means includes colored light emitting sources to enhance illumination of said fingerprint.

14. Apparatus for viewing and printing fingerprint images comprising:
- first camera means for generating image signals representative of an image source on a surface fixed in said apparatus in view of said first camera means,
- said entire first camera means being pivotable between a first and second position,
- means defining a first and second locations where sources of images may be located for viewing by said first camera means in said first and second positions respectively,
- said image signals providing a magnification of an image when said first camera means is in said first position and said image is in said first location, and said image signals providing an actual size image when said first camera means is in said second position and said image is in said second location
- printing means, responsive to said image signals, for generating a print of said image,
- second camera means for generating image signals representative of an image in view of said second camera means, said second camera means adapted to view images on surfaces remote from said apparatus.

* * * * *